(12) United States Patent
Hao et al.

(10) Patent No.: US 9,136,993 B2
(45) Date of Patent: Sep. 15, 2015

(54) BASE STATION, TERMINAL, SYSTEM AND METHOD FOR TRANSMITTING SOUNDING REFERENCE SIGNAL BY USING MULTIPLE ANTENNAS

(75) Inventors: Peng Hao, Shenzhen (CN); Rong Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 306 days.

(21) Appl. No.: 13/259,493

(22) PCT Filed: Jun. 7, 2010

(86) PCT No.: PCT/CN2010/073625
§ 371 (c)(1),
(2), (4) Date: Nov. 21, 2011

(87) PCT Pub. No.: WO2010/145470
PCT Pub. Date: Dec. 23, 2010

(65) Prior Publication Data
US 2012/0120826 A1    May 17, 2012

(30) Foreign Application Priority Data

Jun. 19, 2009    (CN) .......................... 2009 1 0150617

(51) Int. Cl.
*H04W 4/00*    (2009.01)
*H04L 5/00*    (2006.01)

(52) U.S. Cl.
CPC ............ *H04L 5/0023* (2013.01); *H04L 5/0048* (2013.01)

(58) Field of Classification Search
USPC .................................. 370/252, 328, 338, 401
See application file for complete search history.

(56) References Cited

U.S. PATENT DOCUMENTS

| | | | | |
|---|---|---|---|---|
| 8,014,265 | B2* | 9/2011 | Sarkar et al. | 370/203 |
| 8,046,029 | B2* | 10/2011 | Teo et al. | 455/562.1 |
| 8,055,301 | B2* | 11/2011 | Teo et al. | 455/562.1 |
| 8,238,405 | B2* | 8/2012 | Mehta et al. | 375/133 |
| 2009/0042615 | A1 | 2/2009 | Teo et al. | |

(Continued)

FOREIGN PATENT DOCUMENTS

| CN | 101330325 A | 12/2008 |
|---|---|---|
| CN | 101436892 A | 5/2009 |

(Continued)

OTHER PUBLICATIONS

International Search Report for PCT/CN2010/073625, English Translation attached to Original, Both completed by the Chinese Patent Office on Aug. 10, 2010, All together 5 Pages.

*Primary Examiner* — Ricky Ngo
*Assistant Examiner* — Christine Ng
(74) *Attorney, Agent, or Firm* — Brooks Kushman P.C.

(57) ABSTRACT

An eNB, user equipment, system and method for transmitting sounding reference signals by using multiple antennas are disclosed in the present invention, which can reduce overhead of uplink sounding reference signals. The method includes: if an Advanced Long Term Evolution (LTE-A) system has uplink multiple antennas, an eNB configures respectively transmission periods of Sounding Reference Signals (SRSs) which are transmitted over each antenna for a User Equipment (UE); according to the configuration by the eNB, the UE transmits an uplink SRS over each antenna with the corresponding SRS transmission period. The present invention can reduce the uplink SRS overhead in the system remarkably if there are multiple antennas.

8 Claims, 3 Drawing Sheets

(56) References Cited

U.S. PATENT DOCUMENTS

| | | | |
|---|---|---|---|
| 2010/0080187 A1* | 4/2010 | Papasakellariou et al. ... | 370/329 |
| 2010/0215114 A1* | 8/2010 | Kim et al. ................ | 375/267 |
| 2010/0238824 A1* | 9/2010 | Farajidana et al. ......... | 370/252 |
| 2010/0285762 A1* | 11/2010 | Ko et al. ................ | 455/127.1 |
| 2011/0090862 A1 | 4/2011 | Liang et al. | |
| 2011/0261716 A1* | 10/2011 | Kim et al. ................ | 370/252 |
| 2011/0306383 A1* | 12/2011 | Lee et al. ................ | 455/522 |
| 2012/0057491 A1* | 3/2012 | Tiirola et al. ............. | 370/252 |

FOREIGN PATENT DOCUMENTS

| | | |
|---|---|---|
| CN | 101594633 A | 12/2009 |
| WO | 2008030684 A2 | 3/2008 |
| WO | 2008093952 A2 | 8/2008 |

* cited by examiner

BASE STATION, TERMINAL, SYSTEM AND METHOD FOR TRANSMITTING SOUNDING REFERENCE SIGNAL BY USING MULTIPLE ANTENNAS

CROSS-REFERENCE TO RELATED APPLICATION

This application is the U.S. national phase of PCT Appln. No. PCT/CN2010/073625 filed Jun. 7, 2010 which claims priority to Chinese application 200910150617.0 filed Jun. 19, 2009, the disclosures of which are incorporated in their entirety by reference herein.

TECHNICAL FIELD

The present invention relates to communication field, and more especially, to an eNB, user equipment, system and method for transmitting sounding reference signal by using multiple antennas.

BACKGROUND OF THE RELATED ART

Sounding Reference Signal (SRS) is a signal which is used to measure channel state information (SCI) between a user equipment (UE) and an e-Node-B (eNB). In the long term evolution (LTE) system, the UE regularly sends the uplink SNR according to the parameters such as bandwidth, frequency domain position, period and subframe offset indicated by the eNB. The eNB judges the uplink CSI of the UE according to the received SRS and performs the frequency domain selecting scheduling and close loop power control according to the acquired CSI.

In the LTE system, the SRS sequence sent by the UE is acquired by cyclically shifting a root sequence $\bar{r}_{u,v}(n)$ by $\alpha$ in time domain. Different SRS sequences can be acquired by cyclically shifting the same root sequence by different $\alpha$s, and the acquired SRS sequences are orthogonal with each other, therefore, these SRS sequences can be allocated to different UEs to implement Code Division Multiple Access among the UEs. In the LTE system, the SRS sequence defines eight cyclic shifts indicated with a 3-bit signaling and respectively being 0, 1, 2, 3, 4, 5, 6 and 7. In other words, in the same time-frequency resources, the UE within the cell has eight available code resources, the eNB can configure up to eight UEs with the same time-frequency resources to send SRS at the same time.

In the LTE system, the tree structure is used to configure the frequency domain bandwidth of the SRS. Each SRS bandwidth configuration corresponds to one tree structure, and the highest-level SRS bandwidth corresponds to the maximum SRS bandwidth, or called the SRS bandwidth range of this SRS bandwidth configuration, Tables 1 to 4 show the SRS bandwidth configuration in different uplink SRS bandwidth ranges. Take the SRS bandwidth configuration indexed by 1 in Table 1 for example, $B_{SRS}=0$ is the level 0 and is the highest level in the tree structure, the SRS bandwidth of this level is the bandwidth corresponding to 32 Resource Blocks (RBs) and is the maximum SRS bandwidth of this SRS bandwidth configuration; $B_{SRS}=1$ is the level 1, the SRS bandwidth of this level is the bandwidth corresponding to 16 RBs, and one SRS bandwidth of its upper level, level 0, is divided into two SRS bandwidths of the level 1; $B_{SRS}=2$ is the level 2, the SRS bandwidth of this level is the bandwidth corresponding to 8 RBs, and one SRS bandwidth of its upper level, level 1, is divided into two SRS bandwidths of the level 2; $B_{SRS}=3$ is the level 3, the SRS bandwidth of this level is the bandwidth corresponding to 4 RBs, and one SRS bandwidth of its upper level, level 2, is divided into two SRS bandwidths of the level 3, the tree structure is shown as FIG. 1. $m_{SRS,b}$ in Table 1 denotes the SRS bandwidth and $N_b$ denotes the number of the blocks divided from the upper level.

In addition, in the same SRS bandwidth, subcarriers of the SRS are placed with a certain interval, that is, the transmission of the SRS applies the comb structure, wherein the number of frequency combs is 2. As shown in FIG. 2, when each UE sends the SRS, it only uses one (Comb=0 or Comb=1) of the two frequency combs, therefore, the UE can only use a sub-carrier whose frequency domain index is even or odd number to transmit the SRS. This comb structure allows more UEs transmitting the same SRS in the same SRS bandwidth.

In the LTE system, the eNB first allocates a bandwidth configuration index $C_{SRS}$ to all UEs in the cell, according to the number of RBs ($N_{RB}^{UL}$) corresponding to the current uplink bandwidth, it can be determined that which one of tables 1-4 would be used, and then according to $C_{SRS}$, the SRS bandwidth configuration used by the current cell can be determined. For some UE, the eNB might allocate one SRS bandwidth index $B_{SRS}$ (the index of the level in which the UE is located) to the UE. The UE can acquire the SRS bandwidth used by it according to the SRS bandwidth configuration in the cell and the SRS bandwidth index $B_{SRS}$. For example, if the SRS bandwidth configuration index of the current cell is $C_{SRS}=1$, $N_{RB}^{UL}=50$, the SRS bandwidth configuration of the current cell is shown in the second row in Table 2. If the SRS bandwidth index allocated by the current cell to the UE is 1, the SRS bandwidth of this UE occupies 16 RBs, and the SRS bandwidth of the UE is within the range of the SRS bandwidth (that is, the range of the maximum SRS bandwidth, 48 RBs).

After the UE acquires its own SRS bandwidth, it determines the frequency domain initial position at which the UE itself sends the SRS according to the frequency domain position $n_{RRC}$ in the uplink signaling sent by the eNB. As shown in FIG. 3, the UE allocated with different $n_{RRC}$ sends the SRS in different areas within the range of the cell SRS bandwidth.

TABLE 1

| | \multicolumn{8}{c}{$(6 \leq N_{RB}^{UL} \leq 40)$} |
|---|---|---|---|---|---|---|---|---|
| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |

TABLE 1-continued $(6 \leq N_{RB}^{UL} \leq 40)$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 6 | 8 | 1 | 4 | 2 | 4 | 1 | 4 | 1 |
| 7 | 4 | 1 | 4 | 1 | 4 | 1 | 4 | 1 |

TABLE 2

$(40 < N_{RB}^{UL} \leq 60)$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$(60 < N_{RB}^{UL} \leq 80)$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$(80 < N_{RB}^{UL} \leq 110)$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In the LTE system, the UE only sends the SRS in the last single-carrier frequency-division multiple access (SC-FDMA) symbol of the subframe in time domain. The configuration of the UE transmitting the SRS in time domain is related to four parameters: cell-specific SRS period $T_{SFC}$ and the subframe offset $\Delta_{SFC}$, as well as the UE-specific SRS period $T_{SRS}$ and the subframe offset $T_{offset}$. Table 5 and Table 6 respectively show the cell-specific SRS periods and subframe offsets in the frequency division duplexing (FDD) system and the time division duplexing (TDD) system, and the cell-specific SRS period and the subframe offset indicate the time domain subframe position by which all possible UEs in the cell transmit the SRS, while in other subframes, the use of the last SC-FDMA symbol has no relationship with the SRS transmission. For example, the eighth row in Table 5 is srsSubframeConfiguration=7, as shown in FIG. 4, the corresponding $T_{SFC}=5$, and the $\Delta_{SFC}=\{0, 1\}$, the cell-specific SRS period in the cell is 5 subframes, and the positions of the subframe 0 and the subframe 1 in each period can be used by the UE to send the SRS. "S" in FIG. 4 denotes the subframe with the eNB being configured with SRS resource.

TABLE 5 sounding reference signal subframe configuration in FDD

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

TABLE 6 sounding reference signal subframe configuration in TDD

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

Table 7 gives the UE-specific SRS periods and subframe offsets in the FDD system, and Table 8 gives the UE-specific SRS periods and subframe offsets in the TDD system. The UE-specific SRS period and subframe offset provide the time domain period and subframe position by which some UE transmits the SRS. Take $I_{SRS}=17$ in Table 7 as an example, as shown in FIG. 5, the UE sends one SRS every 20 ms, and its time domain position is in the first subframe within 20 ms. "S" in FIG. 5 denotes the subframe at which the UE sends the SRS.

TABLE 7

UE specific SRS Period $T_{SRS}$ and Subframe Offset Configuration $T_{offset}$ in FDD

| SRS Configuration Index $I_{SRS}$ | SRS Period $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 8

UE specific SRS Period $T_{SRS}$ and Subframe Offset Configuration $T_{offset}$ in TDD

| Configuration Index $I_{SRS}$ | SRS Period $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

Single User Multiple Input Multiple Output (SU-MIMO) means that one UE is configured with multiple transmitting antennas to transmit information simultaneously, while the eNB is configured with multiple receiving antennas to receive the information simultaneously. The LTE system does not support the uplink SU-MIMO, therefore, the UE only has one antenna at each time point to send the SRS. To prevent time fading, the UE in the LTE system is configured with two transmitting antennas to support the antenna selection. When the antenna of some UE is selected to be enabled, the UE can select the antenna which is used to transmit the SRS according to $n_{SRS}$ at different time. When the frequency hopping of the SRS in the frequency domain is not enabled, the equation for calculating the antenna index $\alpha(n_{SRS})$ is:

$$\alpha(n_{SRS}) = n_{SRS} \bmod 2;$$

When the frequency hopping of the SRS in the frequency domain is enabled, the equation for calculating the antenna index $\alpha(n_{SRS})$ is:

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd,} \end{cases}$$

where $$\beta = \begin{cases} 1 & \text{where } K \bmod 4 = 0 \\ 0 & \text{otherwise.} \end{cases}$$

The Further Advancements for E-UTRA (LTE-Advanced) system is the evolved version of the LTE system. Besides satisfying or over-satisfying all relevant requirements in the 3GPP TR 25.913: "Requirements for Evolved UTRA (E-UTRA) and Evolved UTRAN (E-UTRAN)", it also satisfies or beyond the IMT-Advanced requirements proposed by the ITU-R. In the LTE-A system, the SU-MIMO is supported in the uplink system, and at most four antennas can be used as the uplink transmitting antennas, that is to say, the UE can use multiple antennas to send SRS at the same time, while the eNB needs to estimate the condition of each channel according to the SRS received in each antenna.

When transmitting the SRS with multiple antennas, the UE needs to configure orthogonal resources for each transmitting antenna in order to acquire the accurate channel estimation, and the orthogonal resources can be time domain resources, frequency domain resources and code resources. Therefore, since each UE needs to be configured with several orthogonal resources when there are multiple antennas, compared with the LTE system, the resource overhead for sending the SRS in the LTE-A system is larger, which has two aspects of influence, one aspect is: the increase of the SRS resource overhead will reduce the resources for bearing the service information, thus affect the system efficiency; the other aspect is: since the amount of the resource for sending the SRS is fixed, the increase of the SRS resource overhead of a single UE increases, thus the number of UEs which can be accommodated in the system is reduced.

Furthermore, when the LTE-A applies asymmetrical resources, the downlink has broader bandwidth than that of the uplink, which on the other hand makes the uplink channel more crowded and results in the higher requirements by the system for the utilization efficiency of the uplink resources.

Therefore, how to reduce the SRS overhead when there are multiple antennas is a problem demanding prompt solution.

SUMMARY OF THE INVENTION

The present invention provides an eNB, a user equipment, a system and a method for transmitting sounding reference signal (SRS) by using multiple antennas.

To solve the above technical problems, the present invention provides a method for transmitting sounding reference signal (SRS) by using multiple antennas, and the method comprises:

When there are multiple uplink antennas in the LTE-A system, the eNB configures a SRS transmission period for a user equipment (UE) transmitting the SRS by each antenna respectively; and Said UE uses the corresponding SRS transmission period to transmit the uplink SRS by each antenna according to the configuration of the eNB.

The step of said configuring comprises: said eNB notifies the UE the SRS transmission period configured for each antenna of the UE via the upper layer signaling or implicit mapping.

Said SRS transmission period comprises the UE-specific SRS transmission period,

In the step of transmitting, said UE transmits the uplink SRS over each antenna by using the corresponding UE-specific SRS transmission period configured by the eNB.

All the SRS transmission periods are the same or different.

The step of said configuration comprises: when the UE has two or more antennas, the SRS transmission periods configured by the eNB for some antennas of the UE are the same.

In order to solve the abovementioned problem, the present invention also provides a system for transmitting the SRS by using multiple antennas, and the system comprises an eNB and a user equipment (UE):

Said eNB comprises a configuration unit and a transmission unit,

Said configuration unit is configured to configure the SRS transmission period for transmitting the SRS over each antenna for the UE;

Said transmission unit is configured to transmit the SRS transmission period configured by the configuration unit to said UE;

Said UE comprises a reception unit and a transmission unit,

The reception unit is configured to receive the SRS transmission period configured by the eNB;

The transmission unit is configured to transmit the uplink SRS with the corresponding SRS transmission period over each antenna according to the SRS transmission period configured by the eNB.

Said eNB transmission unit is configured to notify the UE the SRS transmission period configured respectively for each antenna of the UE via the upper layer signaling or implicit mapping.

Said eNB configuration unit is also configured as that said SRS transmission period comprises the UE-specific SRS transmission period;

Said UE transmission unit is configured to transmit the uplink SRS by each antenna with the corresponding UE-specific SRS transmission period configured by the eNB.

In order to solve the abovementioned problem, the present invention also provides an eNB for transmitting the SRS by using multiple antennas, and the eNB comprises a configuration unit and a transmission unit, Said configuration unit is configured to set the SRS transmission period for transmitting the SRS over each antenna for the UE;

Said transmission unit is configured to transmit the SRS transmission period configured by the configuration unit to the UE.

Said transmission unit is configured to notify the UE the SRS transmission period configured respectively for each antenna via the upper layer signaling or implicit mapping.

Said configuration unit is configured as that said SRS transmission period comprises the UE-specific SRS transmission period.

In order to solve the abovementioned problem, the present invention also provides a user equipment (UE) for transmitting the SRS by using multiple antennas, and the user equipment comprises a reception unit and a transmission unit, Said reception unit is configured to receive the SRS transmission period configured by the eNB for transmitting the SRS;

Said transmission unit is configured to transmit the uplink SRS over each antenna with the corresponding SRS transmission period according to the SRS transmission period configured by the eNB.

The present invention provides an implementation method to reduce the uplink SRS resource overhead in the system when there are multiple antennas, with the present invention, the uplink SRS overhead in the system can be significantly reduced when there are multiple antennas.

PREFERRED EMBODIMENTS OF THE PRESENT INVENTION

Figure 1:
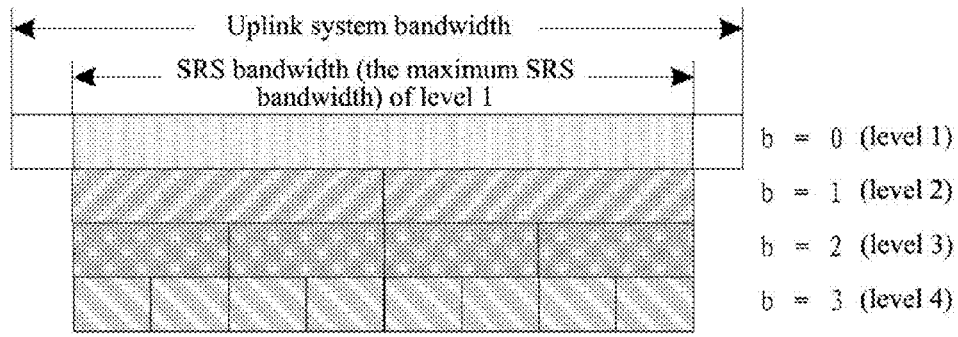
FIG. 1 illustrates the tree structure of the SRS bandwidth.
Figure 2:
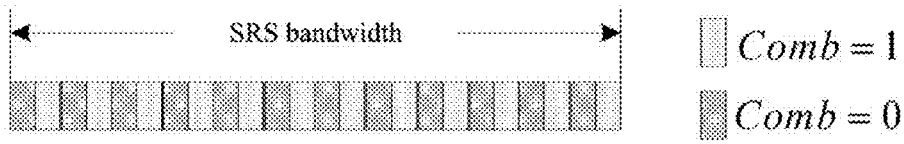
FIG. 2 illustrates the comb structure of the SRS.
Figure 3:
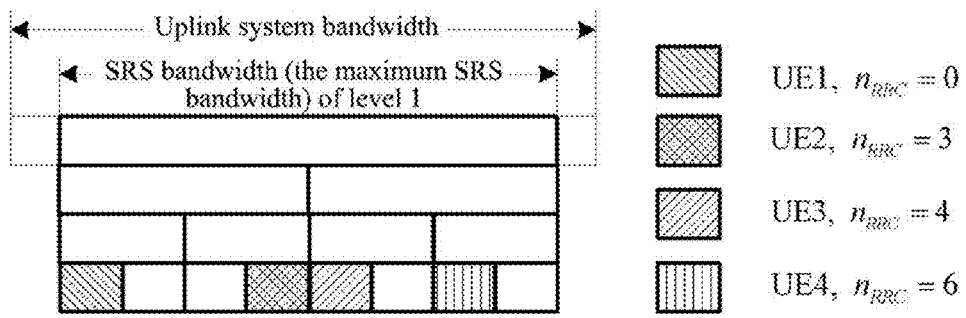
FIG. 3 illustrates the frequency domain initial position at which the UE allocated with different $n_{RRC}$ sends the SRS.
Figure 4:
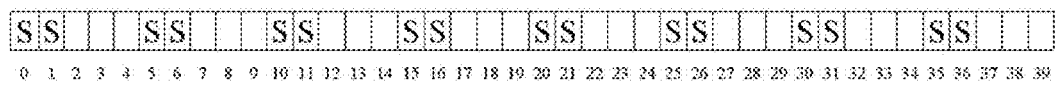
FIG. 4 illustrates the cell-specific SRS transmission period and subframe offset in the LTE system.
Figure 5:
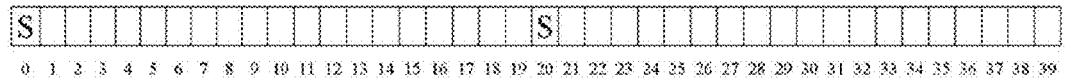
FIG. 5 illustrates the UE-specific SRS transmission period and subframe offset in the LTE system.

The inventive concept of the present invention is: when there are multiple antennas in the uplink of the LTE-A system, the eNB configures the SRS transmission period for transmitting SRS via each antenna respectively for the UE, and the UE sends the uplink SRS by using the corresponding SRS transmission period via each antenna according to the configuration by the eNB.

The SRS transmission period configured and transmitted by the eNB for the UE comprises the UE-specific SRS transmission period, and the UE uses the corresponding UE-specific SRS transmission period configured by the eNB to transmit the uplink SRS.

The SRS transmission periods configured by the eNB for any two antennas in the UE might be the same or different, that is to say, the SRS transmission period configured by the eNB for each antenna in the UE might be the same or different, or if the UE has two or more antennas, the SRS transmission periods of these antennas might be partially the same or different, for example, when the UE has four antennas, the eNB might configure two SRS transmission periods, and two of the antennas use one SRS transmission period, while the other two of the antennas use the other SRS transmission period; alternatively, three of these antennas use one SRS transmission period, while the other one uses the other transmission period.

Specifically, the UE might individually configure a short UE-specific SRS transmission period for some antennas that have relatively high requirements for the channel information, so as to feed back the accurate channel information on the antenna in time, while configure a relatively long SRS transmission period individually for some other antennas. Compared with the method of configuring the same period for all the antennas, in the present method, the redundant time domain resources, frequency domain resources and code resources that originally used by this antenna can be shared with other antennas, thus to save the resources and further to reduce the uplink SRS overhead.

The SRS transmission period of the UE over each antenna can be configured by the eNB via the upper layer signaling or the implicit mapping, for example, the eNB and UE pre-agree the relationship of the SRS transmission period for transmitting the SRS over each antenna, and the eNB configures the period on some antenna via the signaling, while the periods on other antennas are acquired according to the period on this antenna.

The present invention will be illustrated in detail with combination of the embodiments and the accompanying figures. Suppose the number of uplink antennas used by the UE to transmit the SRS is 2 in the first, second and third embodiments, and the uplink antennas are respectively TX0 and TX1, while suppose the number of uplink antennas used by the UE to transmit the SRS is 4 in the fourth embodiment, and the uplink antennas are respectively TX0, TX1, TX2 and TX3. Suppose the uplink system bandwidth in the cell is 50 RB, the cell-specific SRS bandwidth is 48 RB, the UE-specific SRS bandwidth is 12 RB, and the frequency initial position of the UE is $n_{RRC}=0$. Moreover, to simplify the description, a sounding period is defined as the time needed for one antenna to complete one whole bandwidth sounding without repeat.

The First Embodiment

Figure 6:
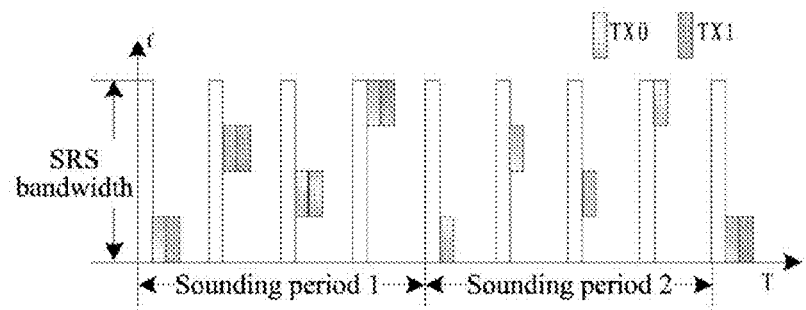
FIG. 6 illustrates transmitting the SRS with antennas configured with different SRS transmission period in accordance with the first embodiment of the present invention.

The UE has two antennas to transmit the uplink SRS. As shown in FIG. 6, the blank block denotes the system uplink SRS bandwidth, the oblique strip block denotes the time-frequency position for the TX0 transmitting the SRS, while the cross oblique strip block denotes the time-frequency position for the TX1 transmitting the SRS. The system respectively configures the SRS transmission periods on the TX0 and the TX1, for example, the SRS transmission periods on the TX0 and the TX1 are different, and the SRS transmission period on the TX1 is two times of that on the TX0, moreover, the TX0 and the TX1 transmit the SRS simultaneously when the number of sounding periods is odd, while only the TX0 transmits the SRS when the number of sounding periods is even, while the TX1 keeps idle, so as to release the time domain resources, the frequency domain resources and the code resources. The period configuration on each antenna can be notified to the UE via the signaling or implicit mapping. Therefore, after the TX0 fulfills two sounding periods for the uplink system SRS bandwidth in the above example, the TX1 only fulfills one sounding period for the uplink system SRS bandwidth. Thus, compared with configuring the same SRS period for all the antennas, this method reduces 25% SRS resource overhead.

The Second Embodiment

Figure 7:
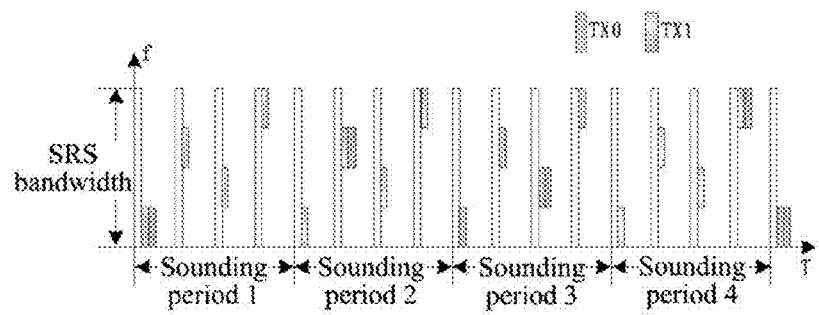
FIG. 7 illustrates transmitting the SRS with antennas configured with different SRS transmission period in accordance with the second embodiment of the present invention.

The UE has two antennas to transmit the uplink SRS. As shown in FIG. 7, the blank block denotes the system uplink SRS bandwidth, the oblique strip block denotes the time-frequency position for the TX0 transmitting the SRS, while the cross oblique strip block denotes the time-frequency position for the TX1 transmitting the SRS. The system respectively configures the SRS transmission periods on the TX0 and the TX1, for example, the SRS transmission periods on the TX0 and the TX1 are different, and the SRS transmission period on the TX1 is four times of that on the TX0, moreover, the TX0 and the TX1 only transmit one SRS in each sounding period while keep idle in other time of this sounding period, so as to release the time domain resources, the frequency domain resources and the code resources. The period configuration on each antenna can be notified to the UE via the signaling or implicit mapping. The TX1 transmits the SRS with the individual frequency bands according to its own frequency hopping order, and transmits one SRS in one TX0 sounding period. In each sounding period of TX0, the TX1 transmits the SR at the time point that the TX0 transmits the SRS signal in this frequency band. Therefore, after the TX0 fulfills four sounding periods for the uplink system SRS bandwidth in the above example, the TX1 only fulfills one sounding period for the uplink system SRS bandwidth. Thus, compared with configuring the same SRS period for all the antennas, this method reduces 37.5% SRS resource overhead.

The Third Embodiment

Figure 8:
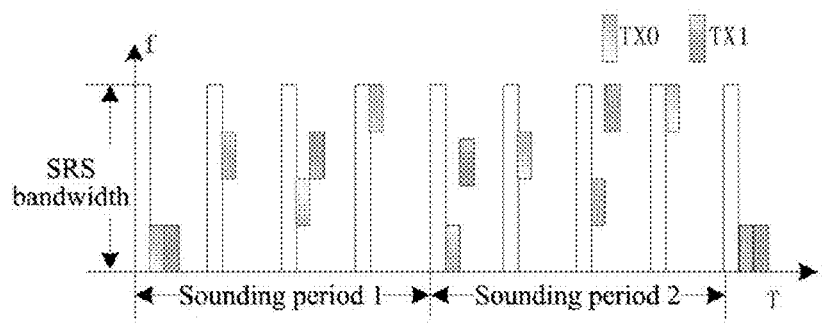
FIG. 8 illustrates transmitting the SRS with antennas configured with different SRS transmission period in accordance with the third embodiment of the present invention.

The UE has two antennas to transmit the uplink SRS. As shown in FIG. 8, the blank block denotes the system uplink SRS bandwidth, the oblique strip block denotes the time-frequency position for the TX0 transmitting the SRS, while the cross oblique strip block denotes the time-frequency position for the TX1 transmitting the SRS. The system respectively configures the SRS transmission periods on the TX0 and the TX1, for example, the SRS transmission periods on the TX0 and the TX1 are different, and the SRS transmission period on the TX1 is two times of that on the TX0, moreover, the TX1 always transmits its own SRS when the TX0 transmits the odd numbered SRS. The period configuration on each antenna can be notified to the UE via the signaling or implicit mapping. Therefore, when the TX0 transmits the even numbered SRS signal, the TX1 keeps idle and releases its time domain resources, the frequency domain resources and the code resources. Since the two antennas individually transmit the SRS according to their own frequency hopping positions, the time domain transmission periods and positions, at some time point, the two antennas would sound different areas in the uplink system SRS bandwidth. Therefore, after the TX0 fulfills two sounding periods for the uplink system SRS bandwidth, the TX1 only fulfills one sounding period for the uplink system SRS bandwidth. Thus, compared with configuring the same SRS period for all the antennas, this method reduces 25% SRS resource overhead.

The Fourth Embodiment

Figure 9:
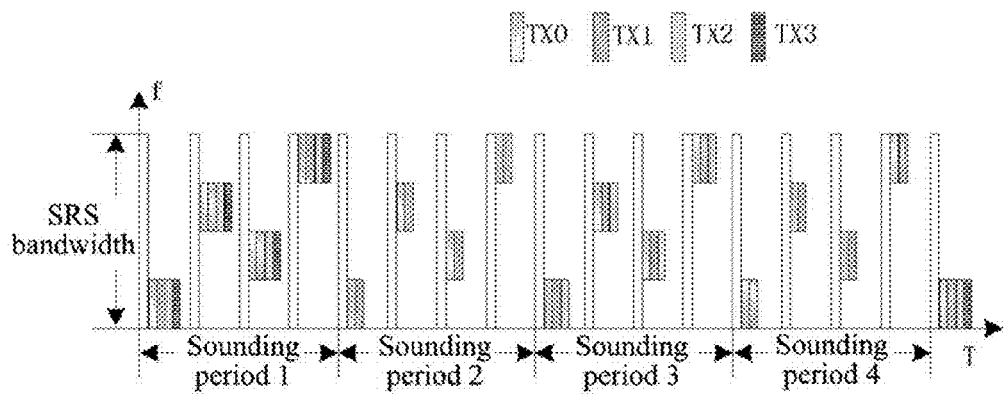
FIG. 9 illustrates transmitting the SRS with antennas configured with different SRS transmission period in accordance with the fourth embodiment of the present invention.

When the UE has four antennas to transmit the uplink SRS, the resource overhead can also be reduced by using the method provided in the present invention. As shown in FIG. 9, the blank block denotes the system uplink SRS bandwidth, the oblique strip block denotes the time-frequency position for the TX0 transmitting the SRS, the cross oblique strip block denotes the time-frequency position for the TX1 transmitting the SRS, the dot block denotes the time-frequency position for the TX2 transmitting the SRS, and the horizontal strip block denotes the time-frequency position for the TX3 transmitting the SRS. The system respectively configures the SRS transmission period on each antenna, for example, the SRS transmission periods on the TX0 and the TX1 are the same, the SRS transmission period on the TX2 is two times of that on the TX0, and the SRS transmission period on the TX3 is four times of that on the TX0. The period configuration on each antenna can be notified to the UE via the signaling or implicit mapping. Since the TX0 and the TX1 have the same SRS transmission period, they always transmit the uplink SRS at the same time-frequency resources. Since the SRS transmission period of the TX2 is two times of that of the TX0, the TX2 transmits the uplink SRS in the odd numbered sounding period of the TX0, while keeps idle in other time, so as to release its time-frequency resources and also code resources. Moreover, since the SRS transmission period of the TX3 is four times of that of the TX0, the TX3 only transmits the uplink SRS in the first period of the four sounding periods of the TX0, while keeps idle in other time so as to release its time-frequency resources and code resources.

Therefore, after the TX0 and TX1 fulfill four sounding periods for the uplink system SRS bandwidth, the TX2 only fulfills two sounding periods for the uplink system SRS bandwidth, while the TX3 only fulfills one sounding period for the uplink system SRS bandwidth. Thus, compared with configuring the same SRS period for all the antennas, this method reduces 31.25% SRS resource overhead.

The abovementioned fourth embodiment is a possible implementation, since the eNB configures the SRS transmission periods for four antennas respectively, other period configuration combinations are not excluded, for example, the periods of the four antennas are different with each other, or the periods of three antennas are the same and are different from the left one.

Figure 10:
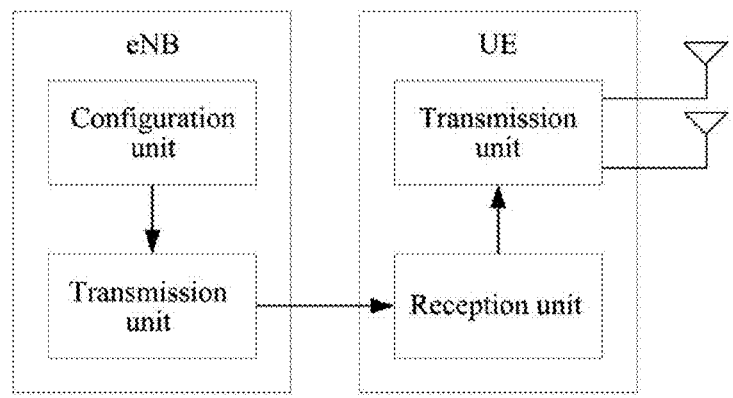
FIG. 10 illustrates the system for implementing the present invention.

The system for implementing the abovementioned method is shown as FIG. 10, and the system comprises an eNB and a UE, where said eNB comprises a configuration unit and a transmission unit, and said UE comprises a reception unit and a transmission unit, wherein, Said configuration unit of the eNB is used to configure the SRS transmission period for transmitting the SRS over each antenna for the UE;

Said transmission unit of the eNB is used to transmit the SRS transmission period configured by the configuration unit to said UE;

The UE reception unit is used to receive the SRS transmission period configured by the eNB;

The UE transmission unit is used to transmit the uplink SRS over each antenna with the corresponding SRS transmission period according to the SRS transmission period configured by the eNB.

Preferably, said transmission unit of the eNB is configured to notify the UE the SRS transmission period configured respectively for each antenna of the UE via the upper layer signaling or implicit mapping.

The SRS transmission period configured and sent by the eNB configuration unit for the UE comprises the UE-specific SRS transmission period; the UE transmission unit uses the corresponding UE-specific SRS transmission period configured by the eNB to transmit the uplink SRS over each antenna.

The above description is only preferred embodiments of the present invention rather than the restriction of the present invention. For those skilled in this field, the description of the above scheme can be modified or improved. Without departing from the spirit and essence of the present invention, all these types of modifications, equivalents or variations should fall in the scope of the claims of the present invention.

INDUSTRIAL APPLICABILITY

The present invention provides an implementation method to reduce the uplink SRS resource overhead in the system when there are multiple antennas, with the present invention, the uplink SRS overhead in the system can be significantly reduced when there are multiple antennas.

What is claimed is:

1. A method for transmitting sounding reference signals by using multiple antennas, comprising:

in an LTE-advanced system with uplink multiple antennas where uplink SU-MIMO is supported, an e-Node-B configuring a period of transmitting sounding reference signals periodically for a user equipment for transmitting the sounding reference signals over each antenna respectively, wherein the periods of transmitting sounding reference signals periodically configured by the e-Node-B are different when the user equipment has two antennas, and the periods of transmitting sounding reference signals periodically configured by the e-Node-B are all different or partially the same when the user equipment has more than two antennas; and the user equipment transmitting uplink sounding reference signals with a corresponding period of transmitting sounding reference signals periodically over each antenna according to the configuration of the e-Node-B.

2. The method of claim 1, wherein the step of an e-Node-B configuring a period of transmitting sounding reference signals periodically for a user equipment for transmitting the sounding reference signals over each antenna respectively comprises: the e-Node-B notifying the user equipment the period of transmitting sounding reference signals periodically configured respectively for each antenna of the user equipment via upper layer signaling or implicit mapping.

3. The method of claim 2, wherein the period of transmitting sounding reference signals periodically comprises a user equipment-specific period of transmitting sounding reference signals periodically, and in the step of the user equipment transmitting uplink sounding reference signals with a corresponding period of transmitting sounding reference signals periodically over each antenna according to the configuration of the e-Node-B, the user equipment transmitting uplink sounding reference signals over each antenna with a corresponding user equipment-specific period of transmitting sounding reference signals periodically configured by the e-Node-B.

4. The method of claim 1, wherein the period of transmitting sounding reference signals periodically comprises a user equipment specific period of transmitting sounding reference signals periodically, in the step of the user equipment transmitting uplink sounding reference signals with a corresponding period of transmitting sounding reference signals periodically over each antenna according to the configuration of the e-Node B, the user equipment transmitting uplink sounding reference signals over each antenna with a corresponding user equipment-specific period of transmitting sounding reference signals periodically configured by the e-Node-B.

5. An e-Node-B for transmitting sounding reference signals by using multiple antennas in LTE-A where uplink SU-MIMO is supported, comprising:

a processor, and a memory storing instructions that, when executed, cause the e-Node-B to configure a period of transmitting sounding reference signals periodically for a user equipment for transmitting the sounding reference signals over each antenna and transmit the configured periods of transmitting sounding reference signals periodically to the user equipment, wherein the periods of transmitting sounding reference signals periodically are different when there are two antennas, and the periods of transmitting sounding reference signals periodically are all different or partially the same when there are more than two antennas.

6. The e-Node-B of claim 5, wherein the memory further stores instructions that, when executed, cause the e-Node-B to notify the user equipment of the period of transmitting sounding reference signals periodically configured respectively for each antenna of the user equipment via upper layer signaling or implicit mapping.

7. The e-Node-B of claim 5, wherein the period of transmitting sounding reference signals periodically comprises a user equipment-specific period of transmitting sounding reference signals periodically.

8. A user equipment for transmitting sounding reference signals by using multiple antennas in LTE-A where uplink SU-MIMO is supported, comprising;

a processor, and a memory storing instructions that, when executed, cause the user equipment to receive a period of transmitting sounding reference signals periodically configured by an e-Node-B for transmitting the sounding reference signals and transmit uplink sounding reference signals over each antenna with a corresponding period of transmitting sounding reference signals periodically according to the periods of transmitting sounding reference signals periodically configured by the e-Node-B, wherein the periods of transmitting sounding reference signals periodically configured by the e-Node-B are different when there are two antennas, and the periods of transmitting sounding reference signals periodically configured by the e-Node-B are all different or partially the same when there are more than two antennas.

* * * * *